COLOR TELEVISION SYSTEM

Filed Dec. 27, 1967 5 Sheets-Sheet 1

INVENTORS
Nathan Gold
Lawrence H.M. Ting
and
Richard F. Weeks
BY
Brown and Mikulka
and
Gerald L. Smith
ATTORNEYS

COLOR TELEVISION SYSTEM

Filed Dec. 27, 1967 5 Sheets-Sheet 2

INVENTORS
Nathan Gold
Lawrence K.M. Ting
BY Richard F. Weeks
Brown and Mikulka
and
Gerald L. Smith
ATTORNEYS INVENTORS
Nathan Gold
Lawrence K. M. Ting
and
Richard F. Weeks
BY
Brown and Mikulka
and
Gerald L. Smith
ATTORNEYS INVENTORS
Nathan Gold
Lawrence K.M. Ting
and
Richard F. Weeks

BY

Brown and Mikulka
and
Gerald L. Smith
ATTORNEYS

INVENTORS
Nathan Gold
Lawrence H. M. Ting
and
Richard F. Weeks
BY
Brown and Mikulka
and
Gerald L. Smith
ATTORNEYS United States Patent Office 3,506,778

Patented Apr. 14, 1970

3,506,778

COLOR TELEVISION SYSTEM

Nathan Gold, Framingham, Lawrence K. M. Ting, Arlington, and Richard F. Weeks, Lexington, Mass., assignors to Polaroid Corporation, Cambridge, Mass., a corporation of Delaware Filed Dec. 27, 1967, Ser. No. 694,014
Int. Cl. H04n 9/10, 9/46
U.S. Cl. 178—5.4 28 Claims

ABSTRACT OF THE DISCLOSURE

A system for deriving a color video signal from single frame or motion picture film. The system utilizes a film format wherein the image recorded within each frame is formed from a repetitive sequence of color coded parallel stripes. The stripes are dimensioned in a manner providing an output at video chrominance subcarrier frequencies when scanned optically at video scan rates. A color burst is provided by inserting a select series of coded stripes along an edge of each film frame. The light scan output may be picked up by a single photodetector.

BACKGROUND

This invention relates to systems for generating televised image signals from photographic images, and has particular reference to an interrelated novel color film and film scanning arrangement for evolving a signal for presentation upon a conventional color television receiver.

The recording of images for televised reproduction heretofore has been accomplished through the use of conventional video cameras in combination with magnetic recording devices or through motion picture filming and replay in conjunction with video studio camera chain systems. With either approach, equipment requirements and related costs are substantial, particularly where the added complexity of generating a color video signal is involved. These complexities have been seen to narrow an otherwise broad utility for video color image reproduction. Should an inexpensive and relatively simple technique be available for generating color video signals, numerous applications for its use will become apparent in fields of endeavor including education, research, amateur photography and remote news coverage.

Several methods for transforming a motion picture sequence into corresponding video signals have entered the market, however, being oriented to studio broadcasting, each has made recourse to complex and costly interrelated electronic and mechanical devices. For the most part, this complexity results from the necessity of combining two very distinct image reproducing systems. A paramount difficulty in interrelating the two systems stems from the difference in acceptable flicker rates existing between them. The scan rate per frame in a television receiver is different from the intermittent projection rates prevalent in the motion picture media. For instance, when motion picture film is projected at a rate of 24 frames per second within the American standard interlaced 30-frame or 60 field per second video scanning system, a method must be found to bring the film motion into coincidence with the 30-frame rate, while maintaining the average speed of the film through the projector at 24 frames per second. Another and related design complexity resides in the pull-down rate intermittently required to move each film frame into position within the film gate. The time interval allocated for this maneuver must correspond with the vertical blanking pulse interval of a standard video signal. As is evident, conventional projector pull-down mechanisms are not adequate for the faster rates required.

Several camera chain systems offering solution to this interface complexity have been introduced into the art. Each of these systems, however, represents a considerable capital investment as a result of their inherently intricate electro-mechanical and electronic make-up. Generally, synchronization is effected between the two imaging systems by converting the 24 frame film rate to the 30-frame television rate. Conversion is realized by introducing a film transport of higher intermittent speed for providing a rapid film pull-down. By permitting alternate film frames to dwell in the film gate $\frac{1}{40}$ second longer than the preceding and following frames, the image may be scanned or projected completely five times while four frames are passing through the projector. Two techniques prevail for transferring the color image or scene of each film frame of the motion picture system into the video signal generating system. In one arrangement, the scenes within the film frames are projected through the media of appropriately timed light pulses into a selection of color sensitive video pick-up tubes, such as orthicons, vidicons, or the like. An optical system is necessitated for properly introducing the projected scene from the film into the pick-up tube assembly.

In a second conventional arrangement, a flying spot scanner projects light through each film frame so as to impinge upon a series of color selective photomultiplier tubes. For this application, the source of light is the moving spot of a bright raster on a cathode-ray tube. The scanning rate of the CRT is sequentially timed for flicker rate compensation.

Each of the above film projection approaches encounters drawbacks, particularly with regard to developing a high-speed film transport or pull-down. The intermittent and rapid transfer imposes debilitating tensile stresses upon film strips. Additionally, the pick-up systems are somewhat costly.

Throughout the development of camera chain systems, it has been considered desirable to substitute a continuous motion film transport mechanism for the intermittent motion devices now prevailing. Such a substitution will permit the use of a greatly simplified and less expensive film manipulating system. Further, continuous motion transport devices impose only nominal stresses upon film strips, thereby allowing a greater latitude of film type and strength selection. Continuous motion film transport devices have not found general acceptance, however, inasmuch as the optical mechanism required to follow or "chase" the vertical motion of a film frame is considered overly intricate and expensive.

In all approaches to projecting motion picture film for television reception, a video signal must be developed which conforms within acceptable tolerances to preselected wave shape configurations.

BRIEF SUMMARY OF THE INVENTION

The inventive system now presented derives a fundamental video signal from color motion picture film through the use of a relatively simple encoding arrangement. With the system, scenes may be photographed in color using any of a wide selection of inexpensive motion picture cameras and, following film processing, imaged upon a conventional color television receiver through a small encoder. By virtue of the relatively low cost of the signal generating encoder, the inventive system opens a broadened spectrum of uses for conventional color television receivers as well as for color photography.

The simplicity of the present system is gained through a unique exploitation of the characteristics of a linearly segmented film color format in combination with an optical scanning arrangement. When appropriately combined, the color film format and scanning system are capable of developing the fundamental characteristics of a video color signal. This resultant signal may then be simply introduced into a conventional color television receiver.

The film structure utilized in the inventive combination is selected so as to evolve an additive color image through the media of thin parallel and vertically aligned stripes, each incorporating three selectively colored bands or lines of macroscopic width. Selected to correspond with the trichromatic compounds of a color video signal, the bands are aligned forming a sequence of the primaries, red, blue, and green. By appropriate selection of the number, color line sequences and sizes of the vertical zones within each film frame, each may be scanned according to a conventional line scan program to derive a signal substantially equivalent to that characteristic of a standard television horizontal scan.

As a further object, the invention combination utilizes a mechanically actuated flying spot scanning arrangement. In addition to its advantageously simple structure, the mechanical scanner of the inventive encoder may be readily adapted to scan motion picture film frames which are transported in continuous, uninterrupted motion. By virtue of its utilization of a continuous motion film transport, the mechanical scanner minimizes the complexity otherwise encountered in accommodating for flicker rate differentials.

Another object of the invention is to provide an encoder having a flying spot scanner which advantageously utilizes inexpensive incandescent sources in combination with inelaborate photodetectors rather than more costly cathode ray tubes and photomultipliers or image orthicons or vidicons. The simplicity of the encoder of the invention is further enhanced as a result of its requiring only a single photodetector rather than individual detectors for red, blue and green signals.

As another object, the imaging system of the invention may be designed to produce a video signal conforming to the requisites of the NTSC television system. The color signal developed by the inventive encoder may provide its color information as a phase modulation on a 3.58 mH. carrier. As a further object, the color burst requisite to the formation of NTSC video signals may be derived through the use of a select sequence of color zones disposed upon the film format utilized with the encoder of the invention.

Other objects of the invention will in part be obvious and will in part appear hereinafter.

The invention accordingly comprises the system, apparatus and method possessing the features, techniques and properties which are exemplified in the description to follow hereinafter and the scope of the application will be indicated in the appended claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION

Figure 1:
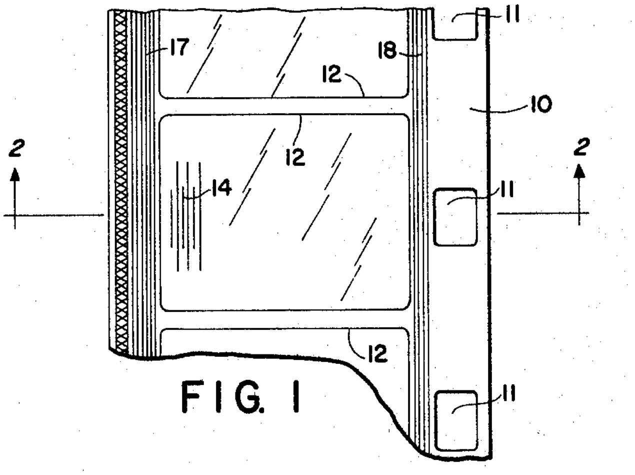
FIGURE 1 is a plan view of a motion picture film format which may be utilized in connection with the instant invention.

Fundamental video broadcast color signals are derived from a recognition that a color sensation may be developed from the sequential or simultaneous interaction of three primary colors, red, blue and green. To achieve this interaction through a signal which maintains a compatibility with the signal requisite to conventional monochrome video transmission, a three-component signal system has been established in the United States of America under the direction of the National Television System Committee (NTSC). Within the standard broadcast color signal, red, green and blue signals from their respective camera outputs are appropriately combined in preselected color balancing ratios to convey brightness and color information. The brightness component of the signal is independent of the color of the scene being televised, while the color information is correspondingly independent of the brightness of the scene. Brightness information is supplied by a luminance or Y signal matrixed as a brightness average from the video signals derived from the synchronized and simultaneous scanning of red, green and blue color-separation images of the scene in proportion to the contribution of each color to brightness. The Y signal has a 4 mc. bandwidth and produces a high quality monochrome picture on the viewing screen of a tri-color receiver. Color is added to this monochrome picture from the tri-color camera signal outputs which are additionally synthesized to form two chrominance signals generally designated as the I and Q signals. The bandwidth of the I and Q signals and the precise manner in which they are matrixed from the primary color video signals, provide the monochrome picture with only so much of the red, green and blue content of each picture element as is necessary for the reproduced scene as a whole to be interpreted by an average observer as being in full color. Thus, the information representative of a scene as a whole is utilized to develop two substantially simultaneous signals on the receiver, the one representing the brightness and the other representing the chromaticity of the images.

Regulative agencies in certain areas, for instance, in the United States of America, have required that the above broadcast signal correspond to a luminance component (the Y signal) transmitted as amplitude modulation of the main picture carrier of the television channel and a simultaneous pair of chrominance components (the I and Q signals) transmitted as the amplitude modulation sidebands of a pair of suppressed subcarriers in phase quadrature having a common frequency relative to the picture carrier of 3.58 mc. The coded chrominance signal is in the form of a 3.58 mc. subcarrier whose amplitude, when a given picture element is being scanned, is a measure of the product of the luminance and purity of the element, and whose phase is a measure of the dominant wavelength of the scanned element. Roughly, it can be considered that the amplitude of the chrominance signal determines the saturation of the color to be reproduced and the phase determines the dominant wavelength.

Since suppressed subcarrier transmission is involved, recovery of the intelligence contained in the chrominance signal entails a synchronous demodulation process which requires, in one standard approach to decoding, creating at the decoder, two 3.58 mc. subcarriers in phase quadrature. The latter may be developed by splitting the output of a suitable stable local oscillator of the required frequency into quadrature components to define a pair of decoder subcarriers. However, phase information must be available if the phases of the latter are to be related to the phases of the two subcarrier components of the color subcarrier. To provide such information, a burst of the subcarrier is gated onto the "back porch" interval of the horizontal blanking pulses which are generated at the transmitter for line synchronization purposes. The burst is used at a receiver in an automatic phase control loop to reference the phase of the output of the local oscillator to the phase of the burst.

The image reproducing system of the present invention derives its fundamental video signal information from the flying spot scanning of a particular color film format. By selecting a color film basically configured having a repetitive sequence of color filter stripes across its width, a horizontal light spot scan may be used to derive luminance and chrominance information in a repetitive sequence. Inasmuch as the latter information is derived in the nature of a modulation of a repetitive cycling of the striped filter colors, the derived chrominance signal may be recognized as amplitude modulation of that frequency with which the scan moves across each set of color filters. The present invention develops such a scan output in a manner evolving a basic video color signal. To synthesize the video signal described, however, the striped filter structure of the film must be of an appropriate shape or dimension so as to evolve requisite subcarrier frequencies. The format also must be amenable to techniques for establishing conventional synchronization signals and the like.

Figure 2:
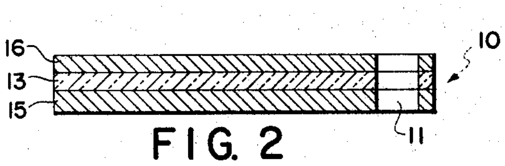
FIG. 2 is a sectional view taken along the line 2—2 of FIGURE 1, showing in exaggerated vertical scale the layering of the film strip.

Referring now to FIGURES 1 and 2, an example of a color film format incorporating the segmented structure requisite to establishing a video image signal is portrayed as a fragment 10 of motion picture film. The film 10 is structured having sprocket or claw guides 11 along one edge. Disposed in conventional fashion along the central portion of the film is a sequence of frames or apertures 12 carrying images of a photographed scene. For the purposes at hand, the film 10 may be selected having dimensions suited for use with a broad variety of camera styles and sizes. The proportioning of film 10 will be recognized as similar to an 8 mm. size currently popular in amateur photography.

The full color reproduction of a scene within frames as at 12 is formed by exposing a color sensitized photosensitive emulsion through a multicolored screen composed of minute filter elements in the three primary colors. This color film structure is readily recognized in the photographic arts. In the film structure used with the present invention, the screen, as is denoted by a layer 13, is formed of a series of stripes, some of which are schematically depicted at 14 within frame 12. Filter stripes 14 are seen to extend in vertically oriented and sequentially spaced parallel relationship across the width of the frame 12. Each of the zones is formed of three filter bands aligned in parallel to provide a consistently repetitive filtering sequence of the primary colors selected. The colors within each of the bands are balanced by width and/or spectral absorption characteristic adjustment in order to additively obtain a proper color mix. In the instant illustration, the sequence of primary colors is selected as red-blue-green for NTSC signal generation. Filter layer 16 is typically deposited upon a film base 15. Film base layers 15 generally are fabricated from a transparent plastic such as one of the cellulose esters, mixed esters or ethers. An image carrying layer 16 is disposed over the filter array 13 and serves to provide image definition in color coded correspondence with the individual color bands of screen 13. When frame 12 is imaged through a conventional projector, filtered light passing from the film becomes additive and a substantially full color scene will be observed. The techniques for thusly deriving these color scenes are well known to the photographic arts. Also present on the film or image carrier displayed at 10 is a sound track 19. An optional addition, the track may be formed by any conventional optical or magnetic method.

In the present invention, as each of the tri-color stripes is horizontally scanned by a flying spot, there is evolved an output representing one cycle of video image information. This cycle comprises three components of color information derived from the image layer 16 attenuation of the light output from the three filters or bands of the stripe. The color components are serially derived and thusly may be detected by appropriate phase registry within the scan pick-up mechanism.

It will be apparent that by coordinating the rate of horizontal scan across the film frame 12 with the number of repetitive stripes scanned, any desired chrominance signal frequency may be derived. In particular, the frequency chosen may be that of the chrominance subcarriers of a standard color video signal.

Additionally disposed upon film 10, but outwardly of the periphery of the frame 12, are filter sets or stripes within areas 17 and 18. Stripes 17 are positioned to derive a color burst of about ten sinewave cycles when scanned horizontally. Scanned at a rate identical to the scan rate across frame 12, the burst area 17 provides regularly timed repetitive wave cycles of the chrominance subcarrier frequency which are utililed in establishing a reference for demodulating the chrominance signal. Burst 17 further disarms the color kill function of a conventional television receiver. The sets or stripes at 18 may be identical to those at 17, however, the end burst signal derived at 18 is provided to serve a different function. Following each horizontal line scan, the end burst functions to signal the completion of a horizontal scan and will be seen to provide a scan coordination or speed control input.

Turning now to the scanning function utilized in conjunction with the above discussed film format, a flying spot arrangement is necessitated which will scan horizontally across the zones 14 at speeds adequate to develop chrominance subcarrier frequencies. Where the video signal desired to be produced is substantially that required by the NTSC color television system, the scan speed and filter stripe spacing must be interrelated so as to derive a frequency of 3.58 mh. Inasmuch as the video signal must be derived from motion picture film, vertical scan rates along with related drawdown speeds must be coordinated to avoid unwanted flicker upon the imaging television receiver. Additionally, synchronization, horizontal and vertical blanking and similar signals must be incorporated within the signal ultimately presented to a color television receiver.

The instant invention permits a scanner-encoder apparatus conforming to the above design parameters, while retaining a simple structure and mode of operation.

Generally, a flying spot scanner suitable for use with the system of the invention may be developed from two rotating segmented discs or wheels. An incandescent source is provided in one disc and a photosensitive pick-off in the other. By arranging one disc to present a vertical scan and the other an intersecting horizontal scan, the equivalent of a flying spot scan will be developed across a film gate situate between the discs. The signal derived at the photoelectric pick-off may then be processed for ultimate presentation to a television receiver.

Figure 3:
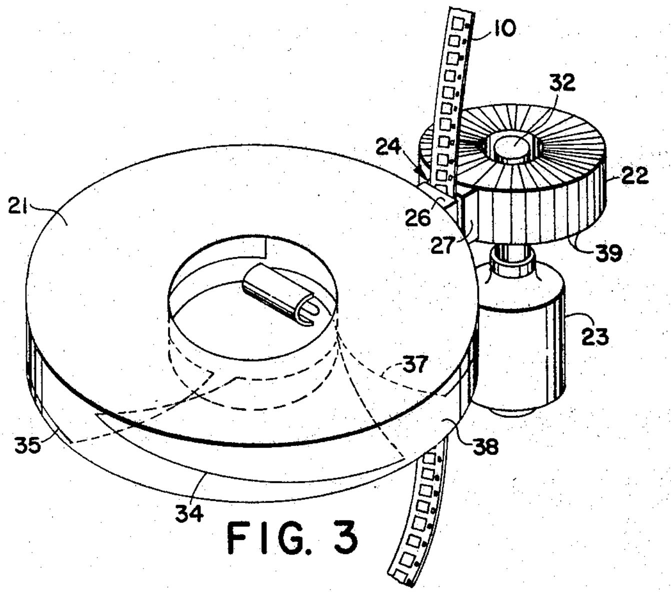
FIG. 3 is a schematic and pictoral representation of an encoder assembly in accordance with the teachings of the invention.

Other advantages accrue from this simple approach to scanning as will become apparent from a consideration of the accompanying description of FIG. 3. In that figure, an elementary scanner is depicted as including a disc or annular shaped vertical scanner 21, the periphery of which is aligned to face that of a horizontal scanning wheel 22.

Motive power for rotating each of the discs 21 and 22 is provided by an electric motor as pictured at 23. Interposed between the rotating wheels 21 and 22 is a film gate 24 through which a motion picture film strip 10 is drawn. Extending from the gate 24 respectively to the peripheries of each of the wheels 21 and 22 are field flatteners 26 and 27. Each of the field flatteners may be formed from fiber optics material so as to compensate for deviations in distance between the plane of the film gate 24 and the curved outer periphery of each scanning wheel. Numerous fiber optical configurations for providing the field flattening function will occur to those versed in the art.

The light source utilized by the encoder is shown positioned at 29 within an opening in the center of the vertical scanner. Light from incandescent source 29 is focused by an eliptical reflector 30 toward the film gate 24. A portion of the light from source 29 will, in the course of operation of the encoder, be detected as a luminance and chrominance signal at a photodetector 32. The latter detector is shown positioned within the open central portion of the horizontal scanner disc 22. It will become apparent in the course of further description of the encoder that the positions of the light source 29 and photodetector 32 may be interchanged. The arrangement depicted in the figures serves to minimize dimensional distortions created by heat from the source 29 combined with stresses developed during rotation.

Figure 4:
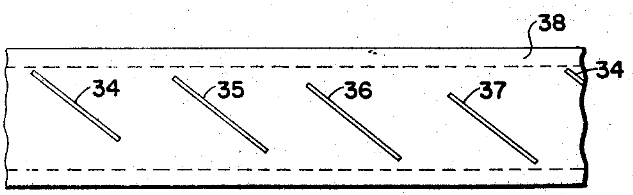
FIG. 4 represents a constricted scale planar development of the peripheral edge of a vertical scanner fabricated in accordance with the invention.

Returning to the vertical scanning wheel 21, it will be seen that light from the incandescent source 29 is directed from the inner periphery of the annular scanner disc to its outer periphery through four sheets of fiber optical material. Extending through the body of the disc 21, the sheets 34 through 37 terminate along its outer peripheral surface 38 to form a series of slits adapted for passage along one side of the film gate 24. When subjected to planar development, the curved peripheral surface 38 assumes a configuration essentially that of the linear arrangement of FIG. 4. Note in the latter constricted scale figure that the outer termini of sheets 34 through 37 form diagonally disposed parallel light projecting slits. The slits are disposed at progressively lower elevation along the periphery. This canted and descending configuration will be seen to accommodate for the vertical motion of film strip 10 during a horizontal line scan. The lateral spacing between the slits will be seen to inherently derive a vertical blanking function.

It will be apparent that light exiting from the slits 34–37 is reimaged by the fiber optics field flattener 26 onto the film 10 within gate 24. Upon each moving film frame there is, in effect, developed a line of light amounting to a horizontal line extending across each frame. The aforesaid horizontal light line is then "seen" optically by one of a number of vertical light pipes 39 formed within the body of horizontal scanning disc 22. Fiber optics field flattener 27 serves the purpose of properly reimaging the horizontal line of light passing from the film 10 onto the periphery of the disc 22. The light pulse signal ultimately focused upon the photodetector 32 will represent the output of a point of light projected through the film 10 at the point of intersection of the vertical and horizontal scanning lines.

By proper choice of the rotational speeds of the scanners 21 and 22 and of the vertical motion of the film strip 10, a flying spot scan rate suitable for television signal production may be developed. Assuming that an amateur motion picture camera system has been used to expose film strip 10, a preselected projection of the scene photographed conveniently may be at the rate of fifteen frames per second. Conversion of the latter rate to a thirty frame per second television rate may be realized by causing each film frame to be scanned four times in one fifteenth of a second, thereby developing a thirty frame per second interlaced television raster.

Figure 5:
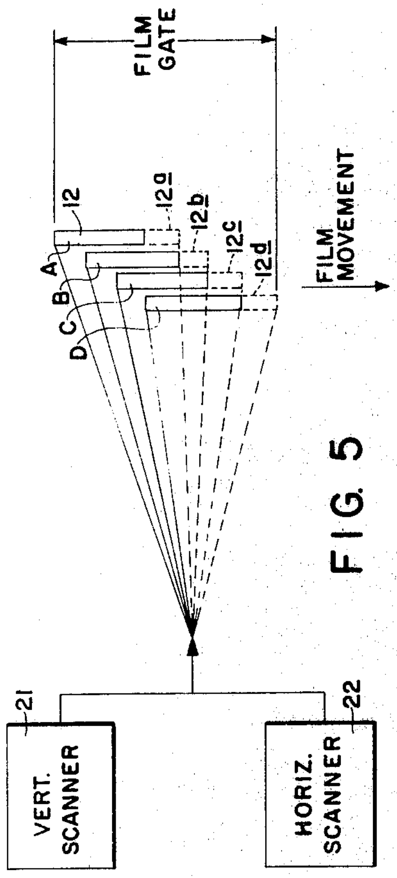
FIG. 5 is a schematic representation of the scanning system of the invention as related to a continuous motion film transport.

Inasmuch as the signal output to be derived from the film strip 10 amounts to only a quantum of light impinging upon a photodetector, the film frame 12 need not dwell within a fixed film gate. Accordingly, the vertical scanner arrangement 21, as has been described above, may be adapted to "chase" each film frame as it moves downward through the film gate 24. Looking to FIG. 5, the vertical scan chasing maneuver of a film frame 12 during its downward movement through the film gate 24 is schematically depicted. The sweeps of each of the four vertical scans are indicated as commencing at the terminus of a solid pointer line and ending at the terminus of a dotted pointer line. Frame 12 is initially scanned within the gate at position A by one segment of the vertical scanner.

As the initial scan progresses down the frame, film pulldown movement will have drawn the bottom edge of the frame to a position as shown in dotted form at 12*a*. At the completion of the initial scan, the frame is at position B whereupon it is again scanned by the next succeeding peripheral segment of disc 21. As in the case of the initial scan, the frame 12 will have progressed to a position 12*b* at the completion of the second scan. The frame 12 is twice again scanned as at positions C and D before passing from the boundary of film gate 24. During each of the latter scans, the film frame 12 will progress to positions indicated in dotted fashion at 12*c* and 12*d*. It will be recognized that to achieve four vertical scans of a film frame within one-fifteenth of a second, the vertical scanner disc 21 must be rotated at 900 r.p.m. Returning to FIG. 4, the light output slits 34 through 37 are shown positioned at progressively lower levels respectively from 34 to 37 along the peripheral length 38 of the vertical scanner. This positioning provides the "chasing" maneuver of the vertical scan as discussed above in connection with FIG. 5. As is apparent, a continuous motion film transport is utilized with the instant encoder. No complex optics or the like are necessitated for chasing a film frame along the film gate of the scanner, this function being provided by the simple expedient of vertically aligning the light slits 34 to 37.

Assuming that the signal desired to be derived from the photodetector 32 will provide color and image information modulated on the 3.58 mH. NTSC color subcarrier, the spacing of the filter stripes within screen 13 of film strip 10 and the horizontal scan velocity must be correlated. Looking initially to the horizontal scan velocity, under the NTSC system, the horizontal scanning frequency must be 15.75 kH. A typical amateur film frame will have a width of about 5.7 mm.; it follows that for this frame width, the horizontal velocity of the flying spot must be $9.0 \times 10^4$ mm./sec. An exemplary configuration for a horizontal scanner having such peripheral surface velocity will provide a 5-inch diameter disc as at 22 rotatable at 14,400 r.p.m. and having 66 light pipe segments as at 39. The thickness of the active area of the disc will be at least twice of height of the film, which for the example presently discussed will be about 14 mm. The width of the optical fiber segments 39 disposed in radiating fashion about the vertical scanner must be roughly equal to that of the individual sets or stripes 14. For the present example, this dimension will be found to be about 10 microns.

Attention is now turned to the basic signal derived through the flying spot scan of film stripes 14. As established earlier, a triad color stripe sequence of the primaries in the order red-blue-green has been selected as exemplary of stripes 14 within screen 13. For the arrangement at hand, each triad or stripe 14 will be about 10 microns in width.

Figure 6:
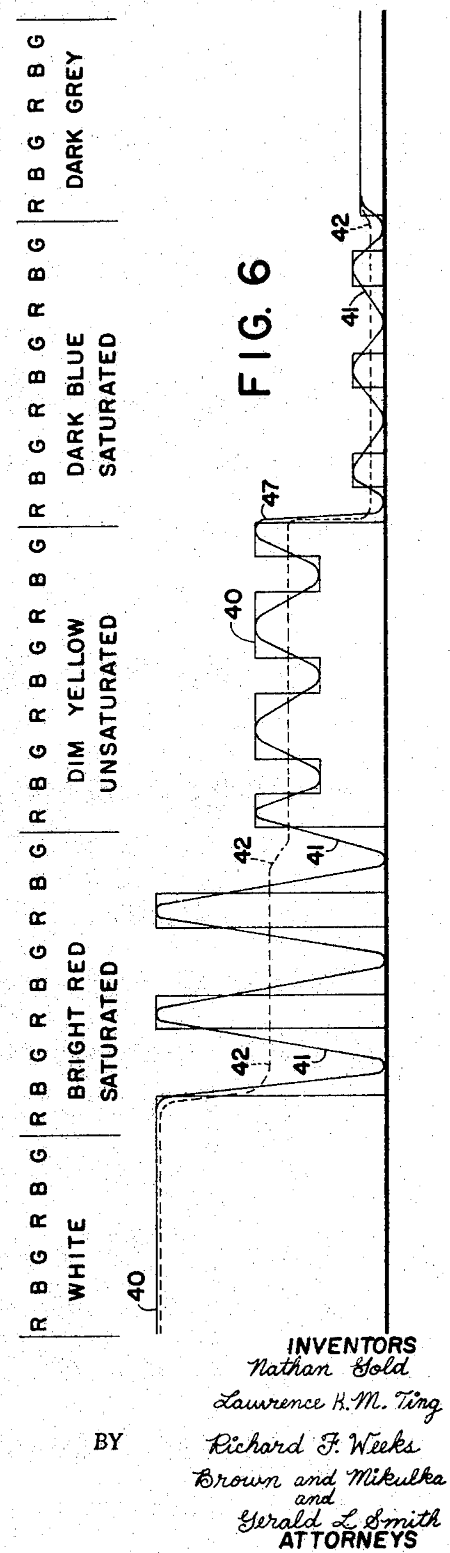
FIG. 6 is a wave shape diagram depicting a representative wave form obtained in scanning a horizontal line within the peripheral confines of a film frame.

Looking to FIG. 6, an illustration of a signal which may be derived from photodetector 32 during a singular horizontal scan is presented. The scale of the waveshape is greatly exaggerated in order that a signal representing a scene of color bands might be depicted. In the figure, the idealized square wave signal theoretically derived from the scan is shown at 40. A more representative signal seen to be rounded off as a result of bandwidth limitations is pictured at 41. Note that for signals representing white or shades of grey there is no distinction between the idealized and actual wave forms, inasmuch as light is projected through each of the red, blue and green bands in equivalent amounts. The luminance or Y component requisite to an NTSC video signal will be present in the signal as the average of the higher frequency chrominants or the average D.C. value. Its value is indicated on the drawing as a dotted line 42. The signal derived from a scan of color burst zones 17 would ideally approximate one sine wave cycle per stripe width. It will be apparent that an adequate approximation of a sine wave cycle may be developed, for instance, by exposing only each blue band. A scan of the thusly exposed zone 17 will derive a regularly timed repetitive signal pattern suitable for phase referencing.

Figure 7:
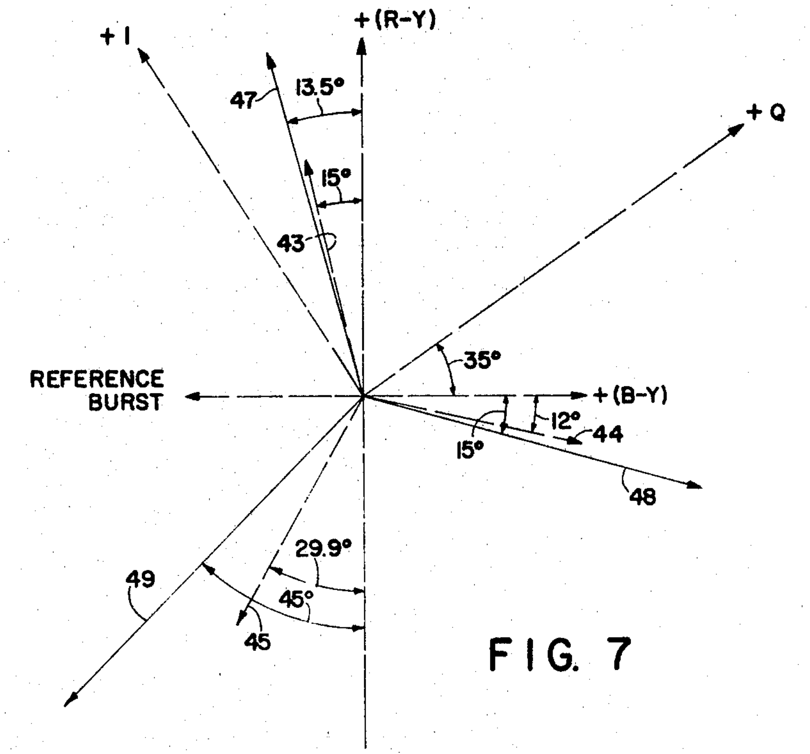
FIG. 7 is a phase diagram of a video chrominance signal showing the relative phase of the chrominance signal generated from the inventive system as compared with standard NTSC signal phase relationships.

The color imaging wave shape of FIG. 6, is readily and uniquely incorporated into the NTSC television system without video receiver alteration. In FIG. 7, a conventional phasor diagram is drawn, showing the standard NTSC signal phase representation in dash line form. Those familiar with the art will recognize that an NTSC color signal as presented to a television receiver will have been broadcast as a difference signal. The difference signal is shown having an (R–Y) coordinate (red primary minus luminance) and a (B–Y) coordinate (blue primary minus luminance). These vectors are phase separated by 90°. The (G–Y) signal (green primary minus luminance) is conventionally derived by matrixing from the above signals and, consequently, the standard vector is not pictured. The vector position for standard I and Q signals are also shown in phase quadrature, or differing in phase by 90°. It will be recognized that by altering receiver tint control (reference oscillator phase shifting), the latter vectors may be rotated to match the phasing of the above-noted difference signals. Assuming the standard video receiver to be designed for signal demodulation on the difference signal axes (R–Y and B–Y), true red will be matrixed out at the red vector shown at 43, the blue signal at vector 44 and the green signal at vector 45.

The signal derived through the system now presented develops a phase relationship shown in solid lines on FIG. 7. By virtue of the earlier described stripe dimension, color band sequential arrangement and scan frequency, each of the color signals derived will be phase positioned from the others by 120°. This phase relationship is depicted on the drawing where the red vector is shown at 47, the blue vector at 48 and the green vector at 49. Note that the vector-phase arrangement of the present system at 47–49 closely approximates the phase relationship of the standard or NTSC signal primary vectors 43–45. For instances, the red vector 47 resides about 15 degrees from the (R–Y) standard difference signal vector and is, consequently, positioned very close to the true NTSC red vector 43.

In similar fashion, the blue vector 48 of the present system will reside within about 15 degrees from the phase position of the (B–Y) difference signal. As a result, the blue NTSC vector 44 will be found positioned adequately near blue vector 48 of the instant system. It follows that the green vector 49 of the present system will be positioned adequately near the true NTSC green vector 45 of the diagram. As is evident from the foregoing, only minor and tolerable deviations from a standard NTSC signal are present in the vector phase relationship.

Since vector positions depend upon both amplitude and phase, it must be ascertained that the relative amplitudes of each primary color signal closely approximate the primary color balancing ratio established by regulation. This criteria is met inherently from the film form utilized with the present system. In order to derive proper whites, the film must be fabricated having an adequate color balance. This same color balance is inherently incorporated into the video signal derived from the film with dismissable deviation from the NTSC system defined color balance.

From the above discussion, it will be apparent that the unique union of film format and scanning technique will evolve a simple but effective video color signal generating system.

Figure 8:
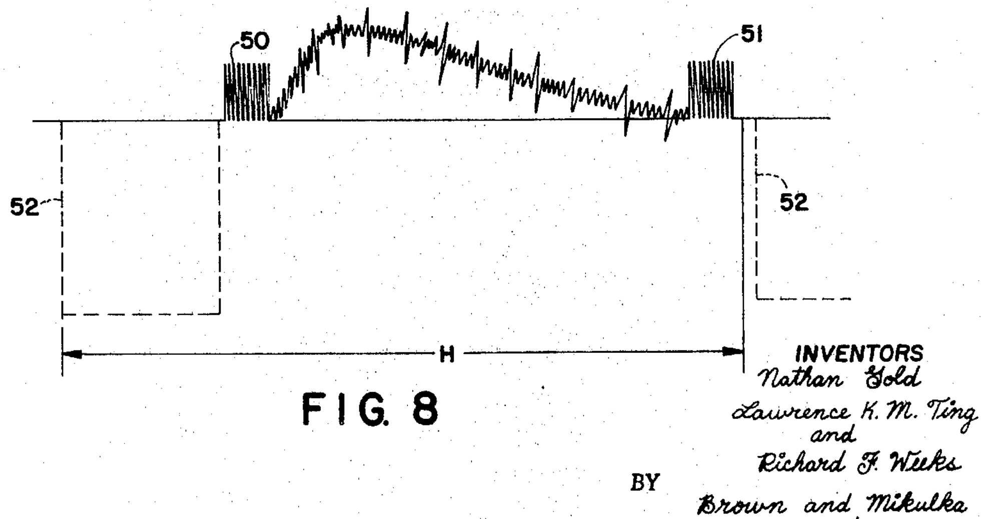
FIG. 8 is a pictoral representation of a wave shape showing a full horizontal line scan incorporating the scanning signal of FIG. 6 in addition to supplementary coding information.

Turning to FIG. 8, a representative signal corresponding to a singular horizontal sweep H is shown. In addition to the image information indicated at 41, the horizontal sweep will include a color burst 50 of about ten cycles, and end burst 51 of about ten cycles, and a horizontal blanking and synchronization function indicated only generally by the dotted line pulse 52. As discussed earlier in connection with FIGURE 1, the color burst signal 47 may be derived from zones 17 on the film strip, while end burst 48 is derived from a scan of zones 18. These zones conveniently may be incorporated within the film 10 format during processing operation. Blanking and synchronization pulses 52 are generated apart from the film 10 format, however, it will be apparent that these synchronization signals may be incorporated within the film 10 as opaque stripes or the like or preselected width. The blanking intervals within the signals are inherently developed from the no-signal masking extant between the light carrying segments of the rotating discs.

Figure 9:
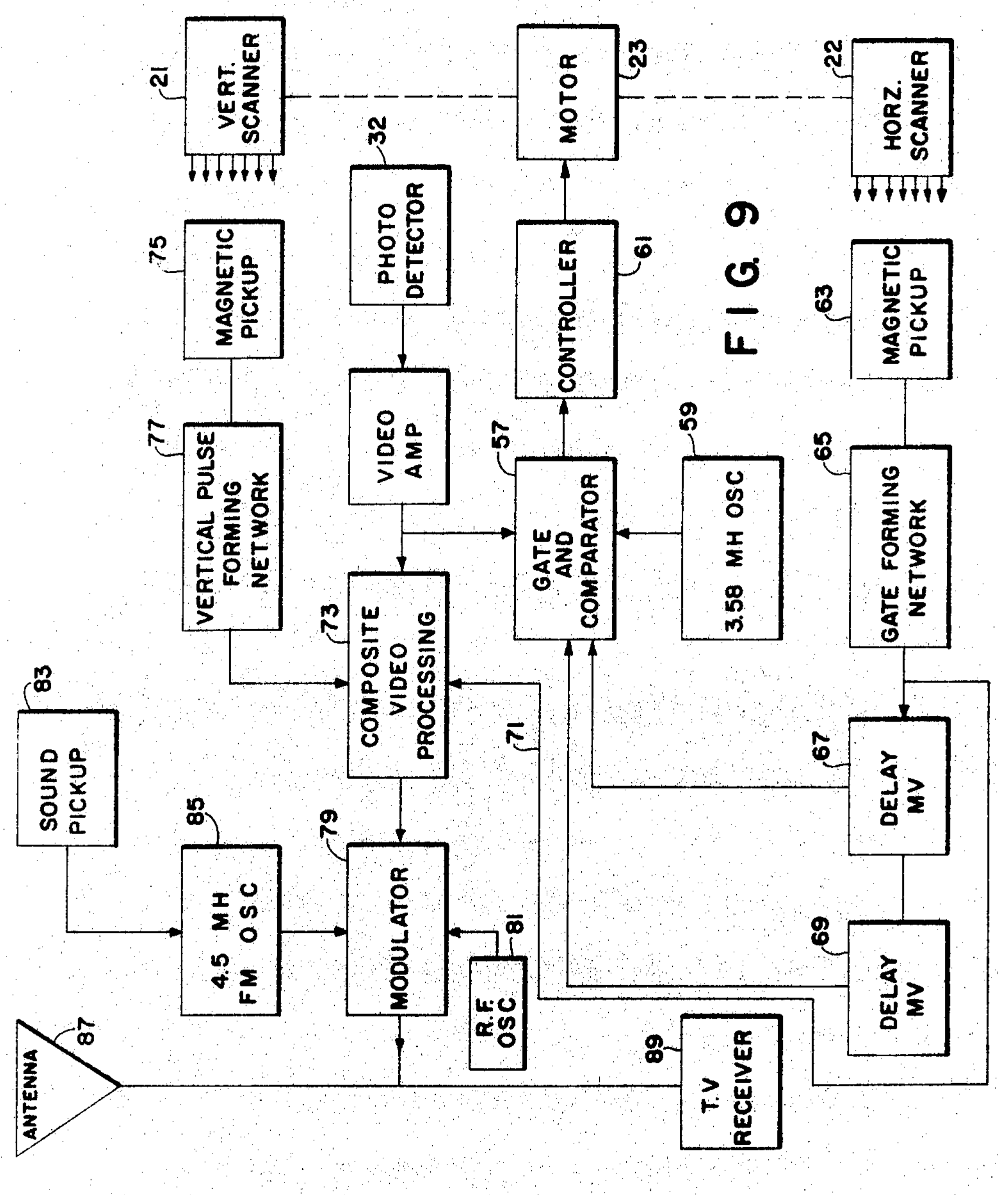
FIG. 9 is a block logic diagram schematically depicting the operation of an encoder fabricated in accordance with the invention.

Turning now to FIG. 9, the functions requisite to forming an NTSC signal are outlined in block diagrammatic fashion. In the diagram, electric motor 23 rotates the vertical scanner disc 21 and horizontal scanner disc 22 at controlled and preselected speeds. As the scanning progresses, photodetector 32 produces a signal of relatively low amplitude which, accordingly, is amplified to improve proportions at video signal amplifier 55. The amplifier signal is introduced into a gate and comparator 57 which, using the input signal from a 3.58 mH. crystal reference oscillator 59, phase compares both the color burst 47 and the end burst 48 to derive a scan speed signal which is presented to a motor control network 61. The rotational speed error signal produced by controller 61 is continually imposed upon the motor 23 to maintain requisite scanning rates. Gating of the color burst and end burst signals may be accomplished by use of a magnetic pick-up 63 mounted next to the horizontal scanning disc 22. Magnetic inserts are embedded within the disc 22 to develop a timed and repetitive signal at pick-up 63. Techniques for generating this form of signal are well established in the art. Of course, the signals may also be derived optically or through numerous similar approaches. The signal generated at pick-up 63 is perfected in a gate forming network 65. A multivibrator delay 67 gates the introductory color burst into comparator 57 while a second multivibrator delay 69 serves to gate the end burst into the same comparator 57. The gate forming network 65 also serves to develop a horizontal synchronization pulse 50 which is shown delivered by line 71 to the composite video processing function 73.

Turning to the vertical scanner 21, a timed repetitive signal is also derived from the rotation of this disc through the use of a magnetic pick-up 75 in fashion similar to that at the horizontal scanner 22. The signal generated at pick-up 75 is introduced into a vertical pulse forming network 77 for insertion into the composite video processing unit 73. As is apparent, the unit 73 functions to insert vertical and horizontal synchronization pulses into the video signal along with performing any other requisite signal processing required to evolve a standardized signal.

The signal from processing unit 73 is introduced into a modulator 79 for modulating a carrier developed by an R.F. oscillator as at 81. Should a sound track be included within the film recording system, it may be picked up by any of a variety of well known methods as indicated by block 83. The signal from pick-up 83 is then utilized to modulate a conventional FM carrier 85 and the resultant signal is inserted along with the video signals at modulator 79 into the antenna or similar equivalent input 87 of a television receiver 89. It will be apparent to those conversant in the art that the circuitry arrangement discussed in connection with FIG. 6 is relatively simple and inexpensive.

Figure 10:
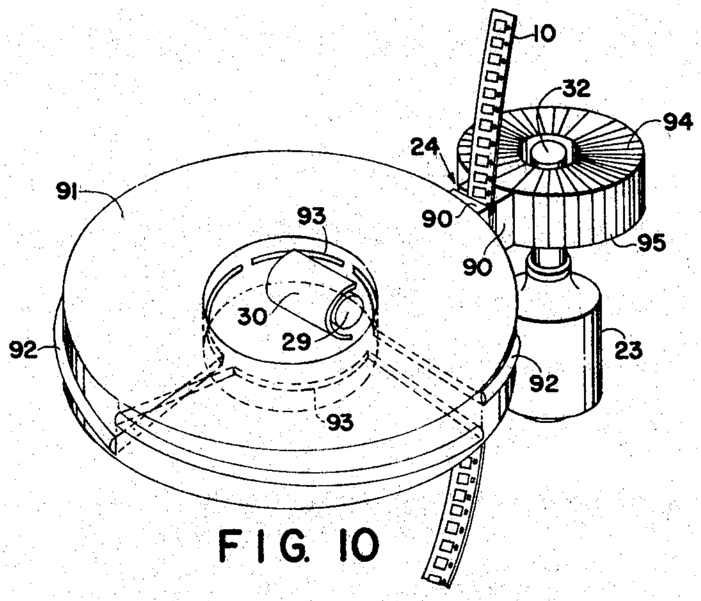
FIG. 10 is a pictoral and schematic representation of an alternate embodiment of a scanning apparatus for use with the encoder of the invention.
Figure 11:
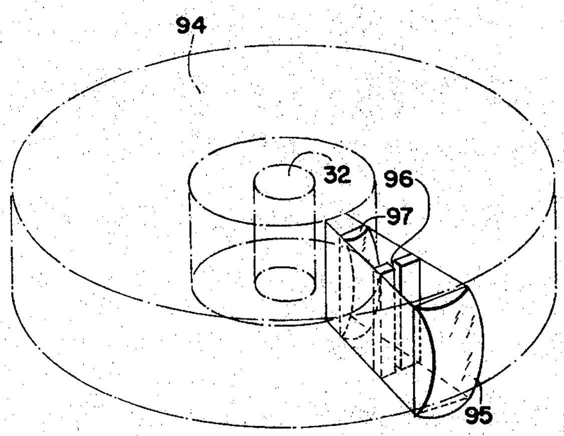
FIG. 11 is a pictoral and schematic representation of a horizontal scanner for use with the present invention with portions shown in phantom to more clearly portray a segmentary line capturing scanning arc.

In FIGS. 10 and 11, an alternate configuration for the vertical and horizontal scanning discs is presented. As may be evidenced from the drawings, the conventional lenses are incorporated within both scanners. In FIG. 10, the vertical scanner disc 91 is seen to include four cylindrical lenses as at 92 mounted in appropriate position along its peripheral surface. Light from source 29 is directed through internal slits 93 to be focused in sequence through cylindrical lenses 92 and film 10. The gate 24 for this arrangement may be formed having single light shields as at 90.

Similar in construction, the horizontal scanner disc 94 incorporates a plurality of spherical segment lenses 95 mounted in a mutually parallel arrangement about the periphery of the disc. As shown more clearly in FIG. 11, each of the peripheral lenses 95 is adapted to image a portion of the slit developed by disc 91 onto a corresponding vertical slit 96 which defines the horizontal resolution. A second spherical lense segment 97 disposed within each horizontal scanner disc segment or sector serves to reimage the slit onto the photodetector 32 situate at the center of the scanner.

The alternate scanner arrangement will be seen to allow a higher resolution for the flying spot signal since the conventional optics serves to focus the light from the vertical scanner, through the film base 15 and onto the emulsion surface 16. However, it will be noted that the structure required for this alternate embodiment is of a more complex nature.

Since certain changes may be made in the above image reproducing system and encoder arrangement without departing from the scope of the invention herein involved, it is intended that all matter contained in the above description or shown in the accompanying drawings shall be interpreted as illustrative and not in a limiting sense.

What is claimed is:

1. A system for producing a color television signal comprising:

means for scanning an image area with light according to a predetermined line scan program;

means responsive to the attenuation of light by an image within said image area for deriving a video signal therefrom;

an image carrier having at least one frame positionable within said image area, said frame having recorded thereon a visible image comprising a repetitive series of parallel stripes arranged in a regular array across said frame transverse to the lines of said line scan program, said stripes characterizing at least in terms of density discrete color components of the image recorded on said frame;

said image carrier also having thereon a color burst zone outside of said frame but within said image area and having recorded thereon a regular sequence of parallel color burst stripes spaced in correspondence with the color-characterizing stripes within said frame, whereby scanning of said color burst zone and said frame within said image area by said scanning means causes said video signal deriving means to produce a combined signal representing a color burst signal and a video signal modulated with a chrominance subcarrier signal which is phase-related to said color burst signal.

2. The system of claim 1 wherein:

said light scan program provides a line-by-line horizontal scan at a selected video scan rate; and said stripes are dimensioned so as to produce, when scanned, discrete signals at a rate corresponding to a select video chrominance subcarrier frequency.

3. The system of claim 1 wherein said image carrier also incorporates a scan limit zone situated outside of said frame oppositely from said burst zone but within said image area and having recorded thereon a regular sequence of stripes coded so as to provide a scan output signal representative of a terminus of each line scan of said frame.

4. The system of claim 3 wherein said scan limit zone stripes are dimensioned and coded identically with said color burst zone stripes.

5. The system of claim 1 in which said image-carrier is in the form of multi-frame elongated motion picture film, and said stripes are aligned parallel with the elongated dimensions of said film.

6. The system of claim 1 wherein said video signal deriving means comprises at least one photodetector.

7. The system of claim 1 wherein said video signal deriving means include:

means for generating a horizontal synchronization pulse; and means for generating a vertical synchronization pulse.

8. The system of claim 1 wherein said image area includes a zone opaque to light, situated outside said frame, said opaque zone being dimensioned so as to derive a signal representative of a horizontal synchronization pulse when scanned by said scanning means.

9. The system of claim 1 wherein each said stripe within said image area comprises selectively dimensioned adjacent and parallel color-sensitive bands arranged within each said stripe in a regular repetitive sequence.

10. The system of claim 9 wherein each of said bands is sensitive only to a select image-defining color.

11. The system of claim 9 wherein each of said stripes is formed of three said bands disposed adjacently in a manner providing video chromaticity signal phasing in the sequence red-blue-green.

12. The system of claim 9 wherein said stripes within said color burst zone are coded so as to provide when scanned a regularly timed repetitive signal at said video signal deriving means.

13. A system for producing a color television signal comprising:

means for scanning an image area with light according to a predetermined light scan program including:

a rotatable peripherally segmented vertical scanning disc, the said segments of which are adapted to provide vertical scanning information along said image area, and a rotatable peripherally segmented horizontal scanning disc, the segments of which are adapted to provide horizontal scanning information along said image area, said disc being operable in association with said vertical scanning disc in a manner providing an input representative of said vertical and horizontal scanning information;

means responsive to said scanning information for deriving a video signal therefrom;

an image carrier having at least one frame positionable within said image area, said frame having recorded thereon a visible image comprising a repetitive series of parallel stripes arranged in a regular array across said frame transverse to the lines of said line scan program, said stripes characterizing at least in terms of density discrete color components of the image recorded on said frame;

said image carrier also having thereon a color burst zone outside of said frame but within said image area and having recorded thereon a regular sequence of parallel color burst stripes spaced in correspondence with the color-characterizing stripes within said frame, whereby scanning of said color burst zone and said frame within said image area by said scanning means causes said video signal deriving means to produce a combined signal representing a color burst signal and a video signal modulated with a chrominance subcarrier signal which is phase-related to said color burst signal.

14. The system of claim 13 wherein a light source is disposed within one said scanning disc; and said video signal deriving means comprises at least one photodetector disposed within the other said scanning disc.

15. The system of claim 13 wherein said video signal deriving means includes inductive means in operative association with said vertical scanning disc, for generating video vertical synchronization signals.

16. The system of claim 13 wherein said video signal deriving means includes inductive means in operative association with said horizontal scanning disc for generating video horizontal synchronization signals.

17. The technique for developing a color television signal comprising:

photographically recording the visible image of a scene within at least one frame of the image area of an image carrier, said recorded image being formed as a repetitive series of parallel stripes disposed in a regular array across said frame and characterizing at least in terms of density discrete color components of the image;

forming a color burst zone upon said image area outside of said frame, said burst zone being configured as a regular sequence of parallel stripes spaced in correspondence with the color-characterizing stripes within said frame;

scanning with light said image area transversely to said stripes according to a predetermined line scan program so as to derive an output of attenuated light corresponding to the transparency variations of said image area; and photodetecting said light output and converting it into a video signal.

18. The technique of claim 17 wherein:

said scanning is performed at a select video scan rate; and said stripes within said image area are dimensioned so as to derive said scanned discrete components of said attenuated light output at a frequency corresponding to that of a predetermined video chrominance subcarrier frequency.

19. The technique of claim 17 including the step of forming a scan limit zone upon said image area outside of said frame and opposite from said color burst zone, said limit zone being configured as a regular sequence of parallel stripes and coded in a manner providing a signal defining the terminus of each line scan.

20. The technique of claim 19 wherein said scan limit zone is formed identically to said color burst zone.

21. An image carrier in the form of photographic film adapted for line scanning by a video color signal generator comprising:

an image area portion having at least one frame for retaining a visible image;

a repetitive series of parallel stripes arranged in regular array across said frame and characterizing discrete color components of said image;

a color burst zone disposed upon said image area outside of said frame portion and comprising a select number of parallel color burst stripes spaced in correspondence with the color-characterizing stripes within said frame.

22. The image carrier of claim 21 wherein each said stripes within said frame comprises selectively dimensioned adjacent and parallel color sensitive bands sequentially arranged within each stripe in a regular repetitive sequence.

23. The image carrier of claim 22 wherein each of said bands is sensitive only to a select image defining color.

24. The image carrier of claim 22 wherein each of said stripes is formed of three said bands disposed adjacently in a manner providing video chromaticity signal phasing information in the color sequence red-blue-green.

25. The image carrier of claim 21 including: a scan limit zone disposed upon said image area outside of said frame portion oppositely from said burst zone, said limit zone comprising a regular sequence of stripes coded so as to provide a scan output signal representative of a terminus of each line scan of said frame.

26. The image carrier of claim 25 wherein said scan limit zone stripes are dimensioned and coded identically with said color burst zone stripes.

27. The image carrier of claim 21 including: a synchronization zone disposed upon said image area portion, said synchronization zone being substantially opaque to light and dimensioned so as to derive a signal representative of a video horizontal synchronization pulse during a line scan.

28. A system for producing a color television signal comprising:

means for optically scanning an image area with light according to a predetermined line scanning program and at a preselected rate;

an image carrier in the form of photographic motion picture film having a series of frames positionable within said image area, each said frame having recorded thereon a visible image comprising a repetitive series of parallel stripes arranged in a regular array across said frame transverse to the lines of said line scanning program, said stripes characterizing at least in terms of density discrete color components of the image recorded on said frame;

a color burst zone disposed upon said image area outside of each said frame and having recorded thereon a regular sequence of parallel color burst stripes spaced in correspondence with the color-characterizing stripes within said frames;

a scan limit zone disposed upon said image area outside of each said frames oppositely from said burst zone and comprising a regular sequence of parallel stripes coded so as to provide a scan output signal representative of a terminus of each line scan of said frame;

photodetector means adapted to convert light deriving from said scanned image area into an electrical signal;

gating means for detecting and isolating the signal derived from said color burst zone and said end burst zone;

comparator means operable in conjunction with said gating means for developing therefrom an error signal regulating the rate of said scanning;

means for generating vertical synchronization pulses;

mean for generating horizontal synchronization pulses;

composite signal processing means for combining the signal from said photodetector means, said vertical synchronization pulses and said horizontal synchronization pulses to derive a video signal; and means for modulating said video signal with a carrier.

References Cited

UNITED STATES PATENTS

| | | | |
|---|---|---|---|
| 2,769,028 | 10/1956 | Webb. | 178—5.4 |
| 3,290,437 | 12/1966 | Goldmark et al. | 178—5.4 XR |
| 3,378,634 | 4/1968 | Macovski | 178—5.4 |

ROBERT L. GRIFFIN, Primary Examiner

R. MURRAY, Assistant Examiner

U.S. Cl. X.R.

178—5.2, 6.7